United States Patent [19]
Chan

[11] Patent Number: 5,938,294
[45] Date of Patent: Aug. 17, 1999

[54] ENGAGING DEVICE FOR DISPOSING WHEELS TO A GOLF CART

[76] Inventor: Shu-Chen Chan, 6th Fl., No. 105, Yung An St., Yuan Lin Chen, Changhua Hsien, Taiwan

[21] Appl. No.: 08/959,008

[22] Filed: Oct. 28, 1997

[51] Int. Cl.[6] .................................................. B60B 23/00
[52] U.S. Cl. ............................ 301/111; 301/121; 301/122
[58] Field of Search ..................................... 301/111, 112, 301/120, 121, 122

[56] References Cited

U.S. PATENT DOCUMENTS

| | | | |
|---|---|---|---|
| 4,043,685 | 8/1977 | Hyams | 301/121 |
| 4,392,690 | 7/1983 | Anderson | 301/121 |
| 4,913,610 | 4/1990 | Oliviera | 301/120 |
| 4,936,598 | 6/1990 | Lee | 301/112 |
| 5,215,356 | 6/1993 | Lin | 301/111 |
| 5,277,480 | 1/1994 | Chiu | 301/111 |
| 5,314,241 | 5/1994 | Cheng | 301/111 |
| 5,494,340 | 2/1996 | Cheng | 301/111 |
| 5,716,107 | 2/1998 | Parket et al. | 301/111 |
| 5,800,023 | 9/1998 | Hartenstine et al. | 301/111 |

FOREIGN PATENT DOCUMENTS 888794  2/1962  United Kingdom ................... 301/121

*Primary Examiner*—D. Glenn Dayoan
*Assistant Examiner*—Long Bao Nguyen
*Attorney, Agent, or Firm*—Watson Cole Grindle Watson, P.L.L.C.

[57] ABSTRACT

An engaging device for disposing a wheel to an axle of a golf cart includes a disk member fixedly connected to the wheel and having a recessed portion defined therein. An oblong hole is defined through the disk member. An actuating plate is movably received in the recessed portion and has a recess defined in a lower edge thereof. A shoulder portion extends inwardly from an inner periphery defining the recess. A lever extends laterally from a side of the actuating plate. A biasing member is disposed to the disk member and biasedly presses the lever downwardly. The axle extends through the wheel, the recess and has an annular groove defined in a periphery thereof so that the shoulder portion is disengagably received therein.

1 Claim, 7 Drawing Sheets

ENGAGING DEVICE FOR DISPOSING WHEELS TO A GOLF CART

BACKGROUND OF THE INVENTION

1. Field of the Invention

The present invention relates to an engaging device and, more particularly, to an improved engaging device to conveniently dispose wheels to a golf cart.

2. Brief Description of the Prior Art

FIG, 1 shows a golf cart which comprises a main frame 51 having a bottom support 52 disposed to a lower end thereof and a handle 53 formed on an upper end thereof. An upper support 50 is disposed to the main frame 51 so that a golf bag (not shown) can be disposed on the bottom support 52 and supported by the upper support 50. A rear axle 55 is disposed transversely to a rear end of the cart so that two rear wheels 60 are respectively disposed to two ends of the rear axle 55. Each of two ends of the rear axle 55 has an annular groove 56 (see FIG. 2) defined in a periphery thereof.

Referring to FIGS. 2 and 3, the two rear wheels 60 are required to be disengagable from the rear axle 55 for a storage purpose, so that each of the rear wheels 60 is mounted to the rear axle 55 by an engaging device 70. The engaging device 70 includes a disk member 71 fixedly connected to an outer side of the rear wheel 60 by at least two bolts 711 (only one is shown) and having a central hole 710 defined therethrough so as to let the rear axle 55 extend through the central hole 710, an actuating plate 73, a biasing member 76 connected to the actuating plate 73 and a cap 77 fixedly connected to the disk member 71 and receiving the actuating plate 73 together with the biasing member 76 therein. The actuating plate 73 has an aperture 731 defined therein and two ears 74, 74' respectively extending in opposite directions therefrom. A shoulder portion 75 extends inwardly from a periphery defining the aperture 731 and a hole 732 is defined in a lower portion of the actuating plate 73 so that one of two ends of the biasing member 76 is engaged with a periphery defining the hole 732 and the other end of the biasing member 76 is mounted to a side of the ear 74 located at a top of the actuating plate 73. The cap 77 has a skirt 771 extending from a periphery thereof and three projections 78 extend from the peripheral edge of the skirt 771 so as to extend through three slits 72 respectively defined in the disk member 71. The three projections 78 are bent after extending through the slits 72 to connect the disk member 71 and the cap 77. The cap 77 further has two slots 79 defined in directions opposite in the skirt 771 so that the two ears 74, 74' respectively extend therethrough. The two biasing members 76 each bias the corresponding actuating plate 73 downwardly to insert the shoulder portion 75 into the annular groove 56 corresponding thereto so as to prevent the rear wheels 60 from disengaging from the rear axle 55.

When disengaging the rear wheels 60 from the rear axle 55, a user simply pushes the lower ear 74' upwardly to disengage the shoulder portion 75 from the annular groove 56. The rear wheels 60 are then able to be disengaged from the rear axle 55 conveniently. However, it is found that the disk member 71 easily becomes loose because bolts 711 are often loosened by vibrations. Furthermore, once the actuating plate 73 or the biasing member 76 has to be replaced, the replacing process will take a lot of time because the cap 77 is securely connected to the disk member 71. In addition, the two ears 74, 74' have only limited length extending from the slots 79 of the cap 77 and gaps between the disk member 71 and the respective ears 74, 74' are so narrow so that it is inconvenient for a user's finger to operate those ears 74, 74'.

The present invention intends to provide an improved engaging device to mitigate and/or obviate the above-mentioned problems.

SUMMARY OF THE INVENTION

The present invention provides an engaging device for disposing a wheel to an axle having an annular groove defined in a periphery thereof. The engaging device comprises a disk member having an inner side from which two projection portions extend so as to define a recessed portion between the two projection portions, and an oblong hole defined through the disk member. Each of the projection portions has a threaded rod extending perpendicularly therefrom and a second groove defined in an outer periphery thereof so that the disk plate is adapted to be connected to a respective wheel by extending the threaded rods through the respective wheel.

An actuating plate is movably received in the recessed portion and has a recess defined in a lower edge thereof so as to let the axle extend therethrough. A shoulder portion extends inwardly from a periphery defining the recess and is engagable with the annular groove of the axle. A lever extends laterally from a side of the actuating plate and extends through the oblong hole. A biasing member is received in the second groove of the disk member to biasedly push the lever downwardly.

It is an object of the present invention to provide an engaging device including a simple structure to conveniently dispose a wheel to a rear axle of a golf cart.

It is another object of the present invention to provide an engaging device which is convenient for maintenance.

Other objects, advantages, and novel features of the invention will become more apparent from the following detailed description when taken in conjunction with the accompanying drawings.

DETAILED DESCRIPTION OF THE PREFERRED EMBODIMENT

Figure 1:
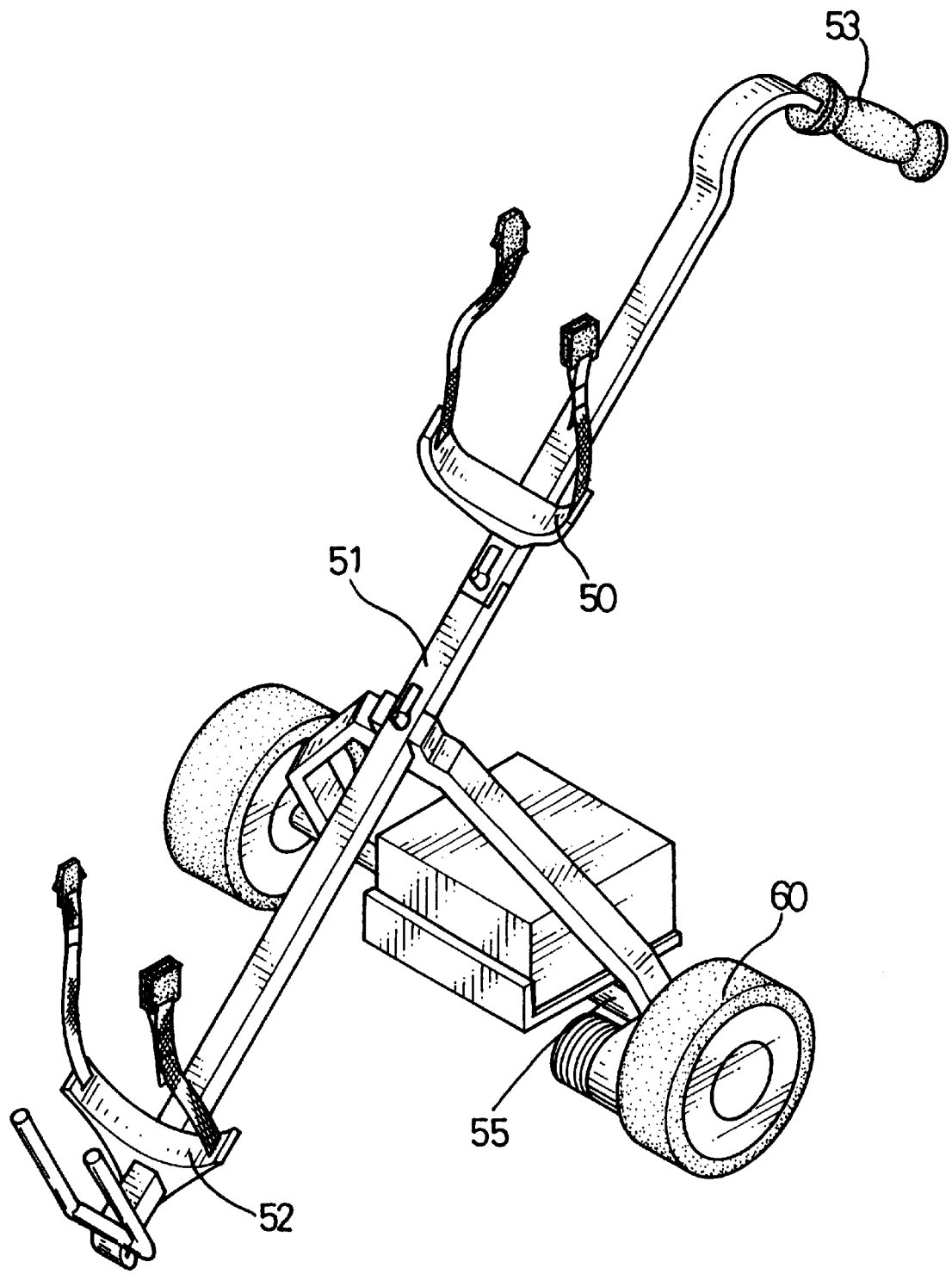
FIG. 1 is a perspective view of a conventional golf cart.
Figure 2:
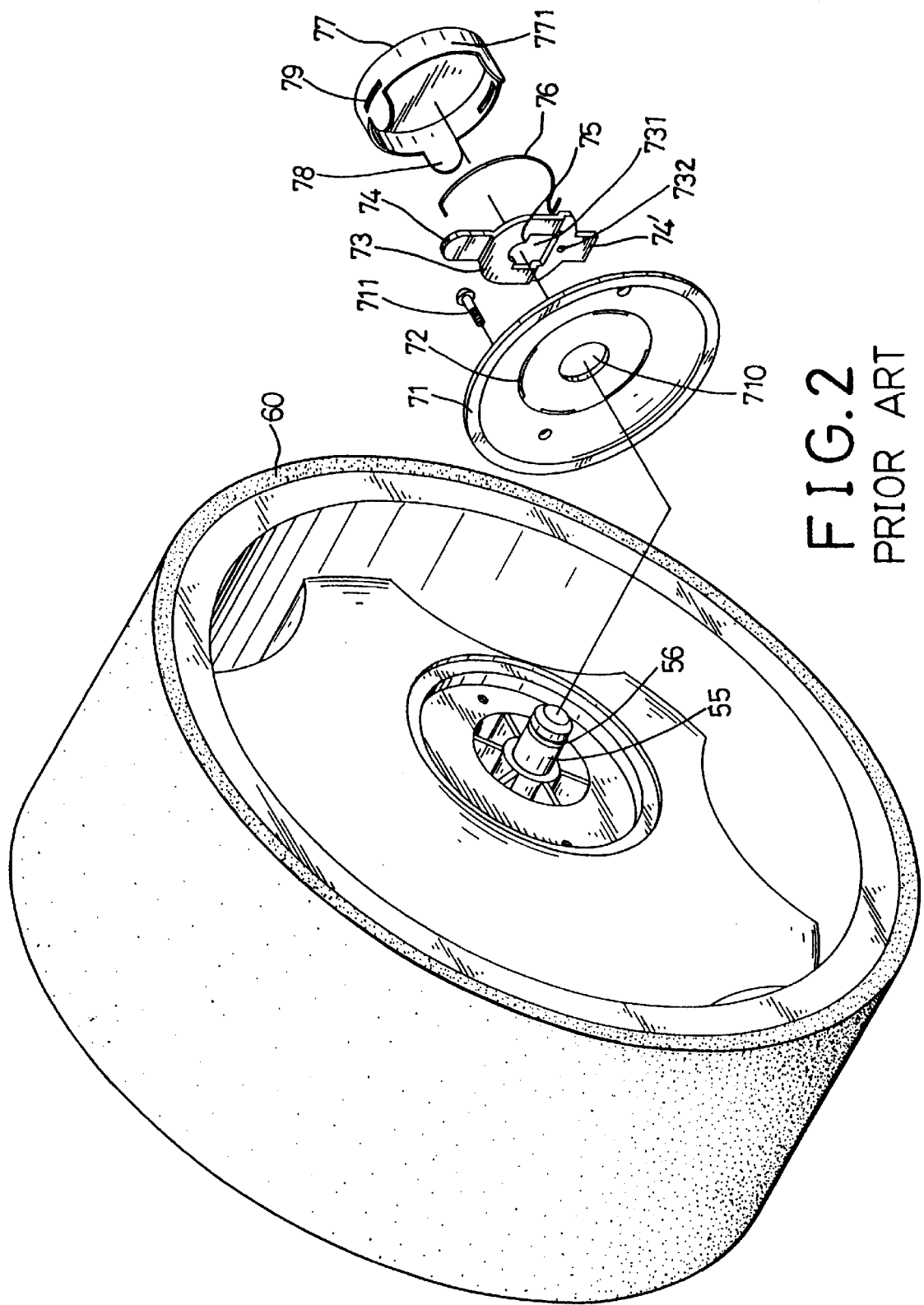
FIG. 2 is an exploded view of a wheel and a conventional engaging device.
Figure 3:
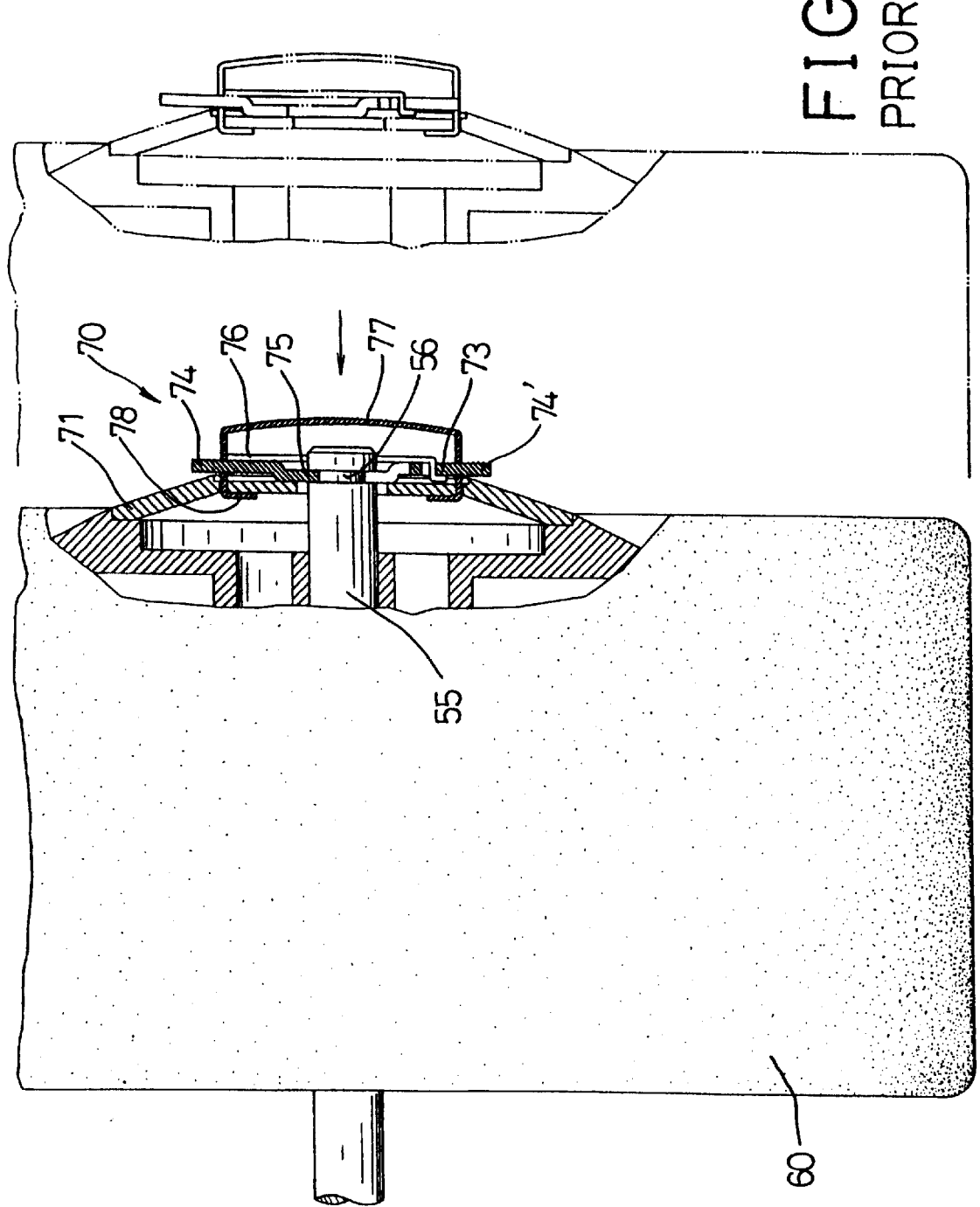
FIG. 3 is a side elevational view, partly in section, of the conventional engaging device attached to the wheel.
Figure 4:
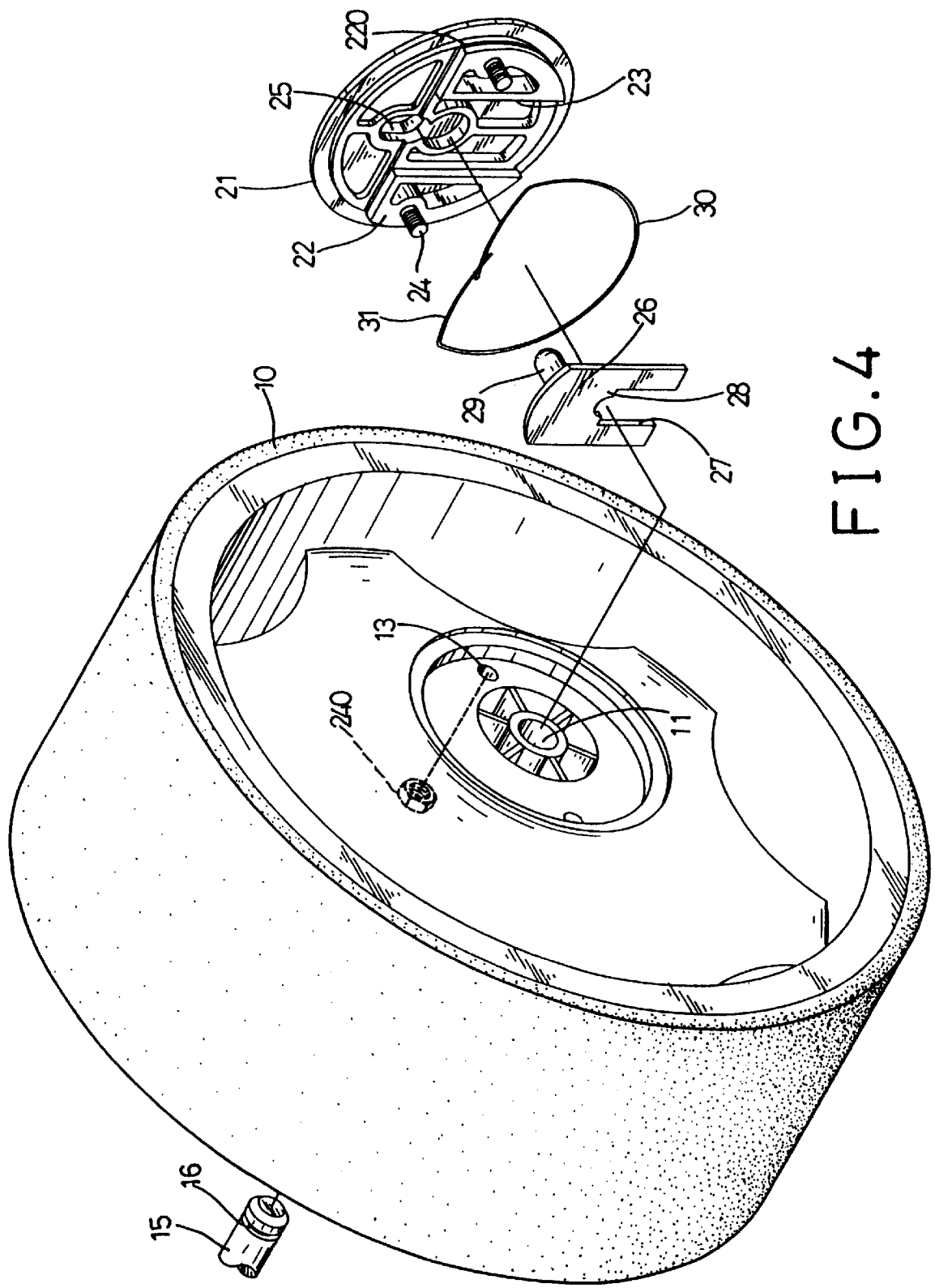
FIG. 4 is an exploded view of a wheel and an engaging device in accordance with the present invention.
Figure 5:
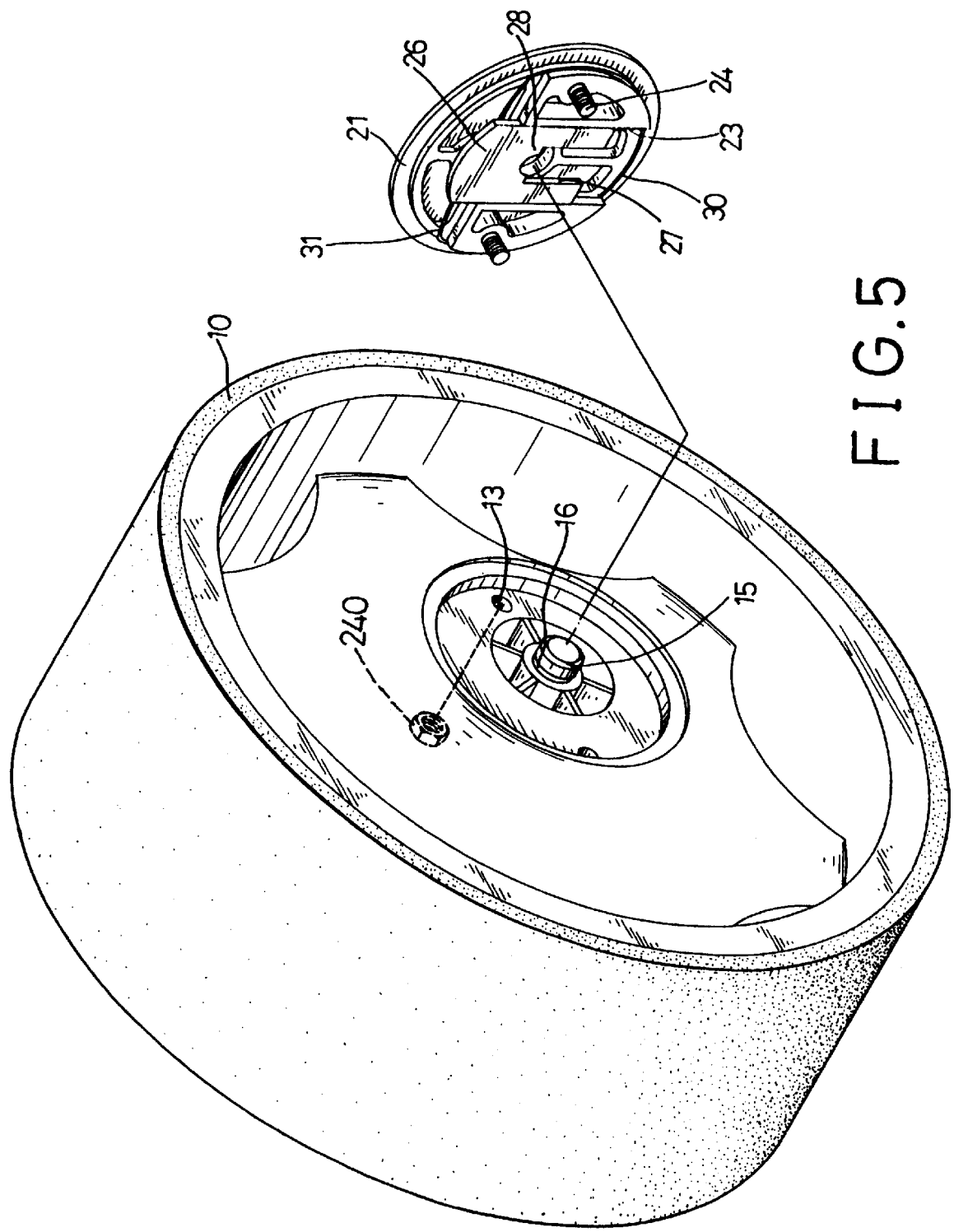
FIG. 5 is an exploded view of the wheel and the assembled engaging device in accordance with the present invention.

Referring to the drawings and initially to FIGS. 4 and 5, two ends of a rear axle 15 of a golf cart (not shown) each has annular groove 16 defined in a periphery thereof and a wheel 10 has a central passage 11 defined therethrough for the rear axle 15 to extend therethrough. The wheel 10 further has two holes 13 defined therethrough and located in parallel with the central passage 11.

Figure 7:
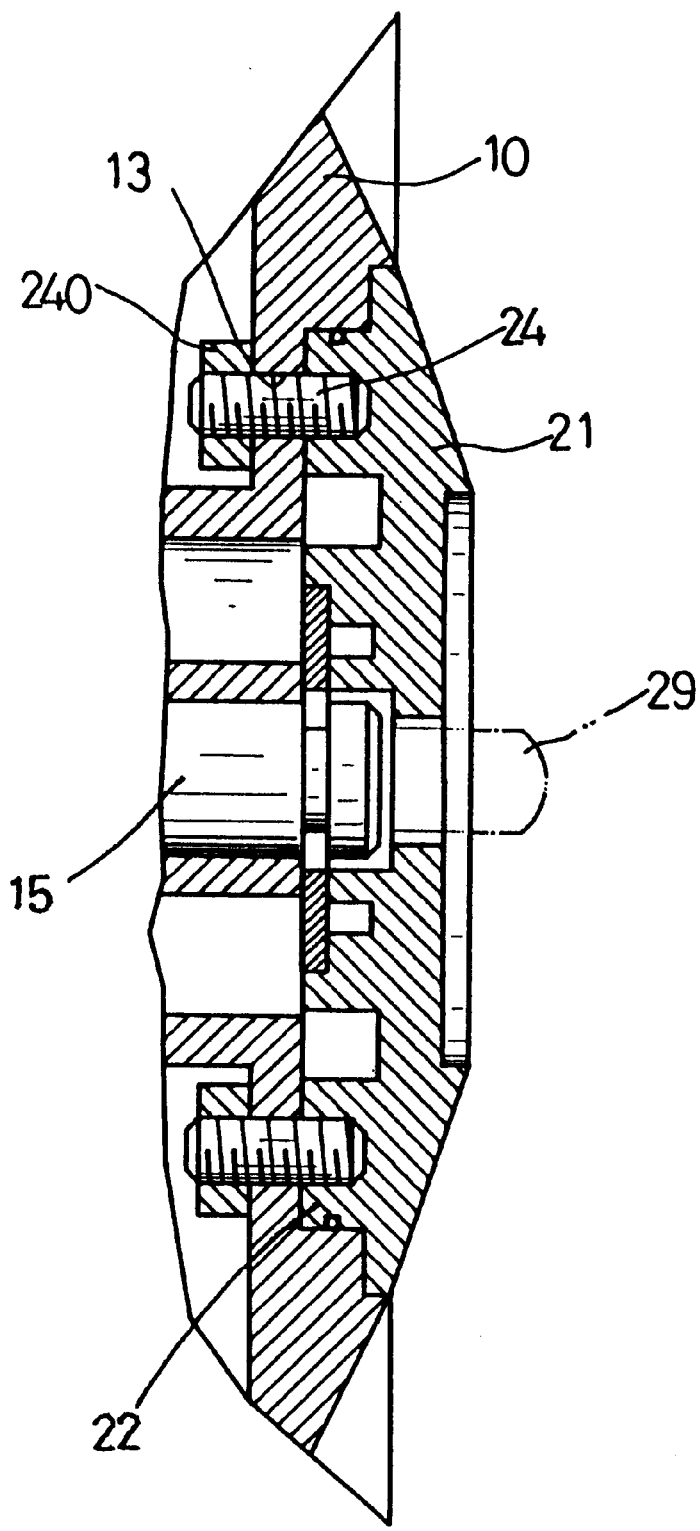
FIG. 7 is a sectional side elevational view of a part of the wheel and the engaging device to show how a disk member of the engaging device is connected to the wheel.

An engaging device in accordance with the present invention generally includes a disk member 21 having an outer side and an inner side from which two projection portions 22 extend so as to define a recessed portion 23 between the two projection portions 22, and an oblong hole 25 is defined through the disk member 21. Each of the projection portions 22 has a threaded rod 24 extending perpendicularly therefrom. A second groove 220 is defined in an outer periphery of the projection portions 22. The disk plate 21 is connected to the wheel 10 by extending the two threaded rods 24 through the holes 13 of the wheel 10 and subsequently engaging with two nuts 240 as shown in FIG. 7.

An actuating plate 26 has a recess 27 defined in a lower edge thereof and a shoulder portion 28 extending inwardly from a periphery defining the recess 27. A lever 29 extends laterally from a side of the actuating plate 26 so that the actuating plate 26 is movably received in the recessed portion 23 with the lever 29 extending through the oblong hole 25, while the shoulder portion 28 being engagable with the groove 16 of the axle 15.

A biasing member 30 is received in the second groove 220 of the disk member 21 and has two pressing ends 31 both compressing the lever 29 downwardly.

Figure 6:
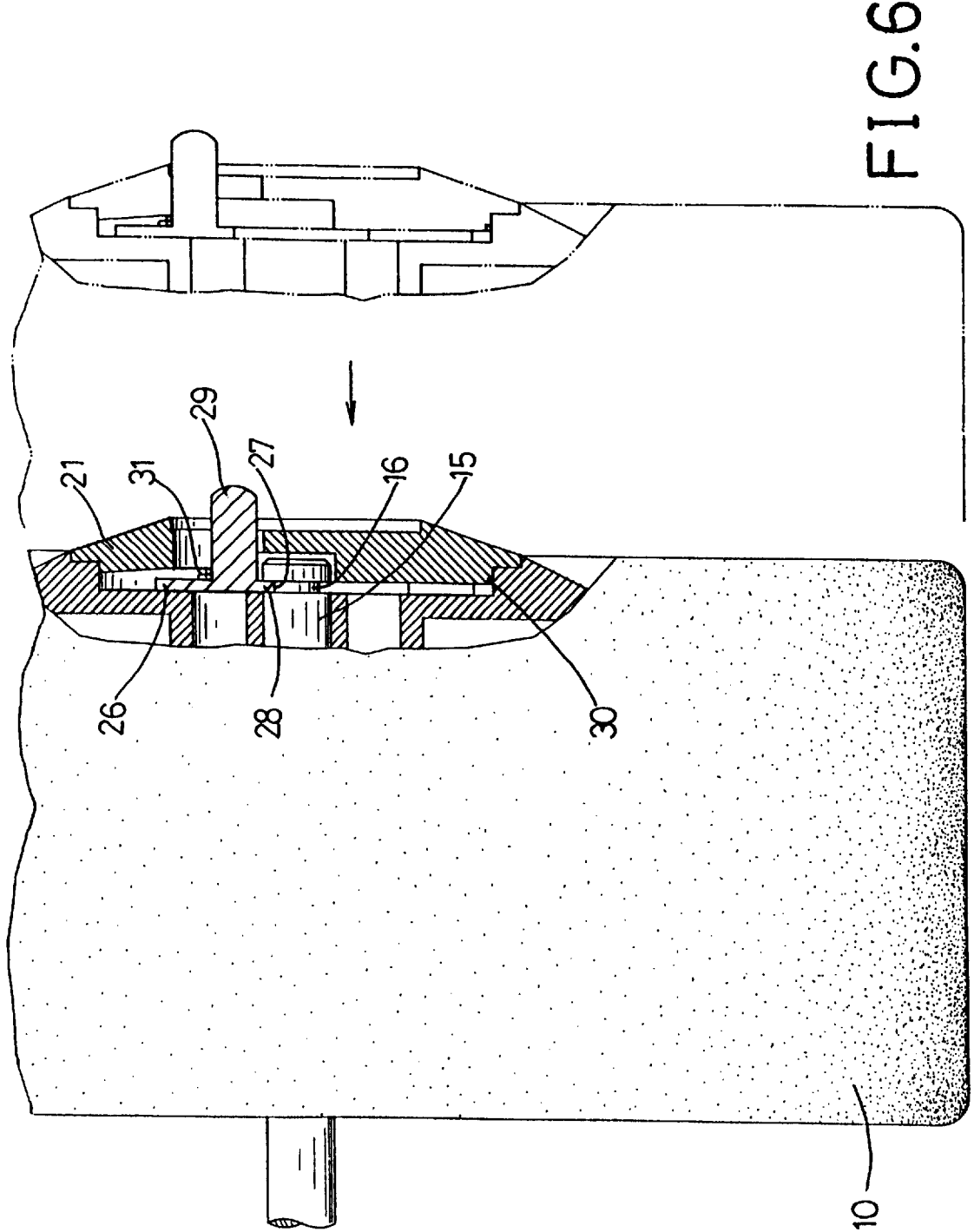
FIG. 6 is a side elevational view, partly in section, of the engaging device attached to the wheel.

Referring to FIG. 6, when disposing the wheel 10 with the engaging device to the rear axle 15, a user (not shown) pulls the lever 29 upwardly and mounts the wheel 10 to the rear axle 15, and releases the lever 29 to let the actuating plate 26 drop by the biasing force of the biasing member 30 so that the shoulder portion 28 is received in the annular groove 16 of the rear axle 15 and the wheel 10 is securely mounted to the rear axle 15. When disengaging the wheel 10 from the rear axle 15, the user pulls the lever 29 upwardly to disengage the shoulder portion 28 from the annular groove 16 so that the wheel 10 can be easily disengaged from the rear axle 15.

The disk member 21 is easily disengaged from the wheel 21 simply by loosening the nuts 240 so that the biasing member 30, the threaded rods 24 and the actuating plate 26 are conveniently accessed.

Although the invention has been explained in relation to its preferred embodiment, it is to be understood that many other possible modifications and variations can be made without departing from the spirit and scope of the invention as hereinafter claimed.

What is claimed is:

1. An engaging device for disposing a wheel to an axle having an annular groove, comprising:

a disk member having an outer periphery, and an outer side and an inner side from which two projection portions extend so as to define a recessed portion between said two projection portions, an oblong hole defined through said disk member, each of said projection portions having a threaded rod extending perpendicularly therefrom and a second groove defined in the outer periphery of the disk member, said disk plate being adapted to be connected to said wheel by extending said threaded rods through said wheel;

an actuating plate having a lower edge and a recess defined in said lower edge and a shoulder portion extending inwardly from a periphery defining said recess, said shoulder portion being engageable with said annular groove of said axle, a lever extending laterally from a side of said actuating plate so that said actuating plate is movably received in said recessed portion with said lever extending through said oblong hole, and a biasing member received in said second groove of said disk member and having two pressing ends for compressing said lever radially inward.

* * * * *